(12) United States Patent
Bocchiola

(10) Patent No.: US 7,368,691 B2
(45) Date of Patent: May 6, 2008

(54) INDUCTION HEATING APPARATUS

(75) Inventor: Cesare Bocchiola, Milanese (IT)

(73) Assignee: International Rectifier Corporation, El Segundo, CA (US)

( * ) Notice: Subject to any disclaimer, the term of this patent is extended or adjusted under 35 U.S.C. 154(b) by 285 days.

(21) Appl. No.: 10/946,945

(22) Filed: Sep. 22, 2004

(65) Prior Publication Data

US 2005/0105313 A1    May 19, 2005

Related U.S. Application Data

(60) Provisional application No. 60/506,189, filed on Sep. 25, 2003.

(51) Int. Cl.
*H05B 6/04* (2006.01)
*B23K 11/24* (2006.01)

(52) U.S. Cl. .................. 219/661; 307/112

(58) Field of Classification Search ........... 219/661, 219/662, 663, 660, 715, 667; 307/112, 113, 307/125, 127, 138; *H05B 6/04*; *B23K 11/24*
See application file for complete search history.

(56) References Cited

U.S. PATENT DOCUMENTS

| | | | | |
|---|---|---|---|---|
| 4,533,986 | A * | 8/1985 | Jones ..................... | 363/17 |
| 5,488,269 | A * | 1/1996 | El-Hamamsy et al. ...... | 315/307 |
| 5,546,295 | A * | 8/1996 | Prete et al. ............ | 363/17 |
| 5,657,219 | A * | 8/1997 | Stanley ................. | 363/132 |
| 5,986,912 | A * | 11/1999 | Hsiao et al. ............ | 363/147 |
| 6,583,999 | B1 * | 6/2003 | Spindler et al. ......... | 363/98 |
| 6,909,255 | B2 * | 6/2005 | Janicke et al. .......... | 318/439 |
| 2002/0167821 | A1 * | 11/2002 | Xing et al. ............. | 363/21.11 |
| 2003/0173907 | A1 * | 9/2003 | Chen et al. ............. | 315/291 |

FOREIGN PATENT DOCUMENTS

| | | |
|---|---|---|
| JP | 2002-170657 | 6/2002 |
| JP | 2003-151751 | 5/2003 |
| KR | 1997-64514 | 10/1997 |

OTHER PUBLICATIONS

Forest, F., et al., "Les systèmes de cuisson par induction 'grand public' ou l'Electromagnétisme et l'Electronique dans nos cuisines", Date Unknown.
Official Notice of Rejection mailed Dec. 5, 2006 in Japanese Patent Application No. 2004-280424, w/translation.

* cited by examiner

*Primary Examiner*—Daniel Robinson
(74) *Attorney, Agent, or Firm*—Ostrolenk, Faber, Gerb & Soffen, LLP

(57) ABSTRACT

Apparatus for providing electrical power to at least one inductor wherein the at least one inductor is disposed to inductively couple the electrical power to an electrically conductive object to heat the electrically conductive object by inducing electrical current to flow in the electrically conductive object, the apparatus comprising at least one inductor, at least one first half-bridge converter coupled across a DC bus and having an output coupled to a first terminal of the at least one inductor; and at least one second half bridge converter coupled across the DC bus and having an output coupled to a second terminal of the at least one inductor, each half bridge converter having first and second alternately conductive series connected switches connected between the DC bus, the at least one inductor being energized by alternately turning on respective ones of the first and second switches of each converter to cause current to flow from the DC bus alternatingly through the at least one inductor from the first and second converters.

17 Claims, 3 Drawing Sheets

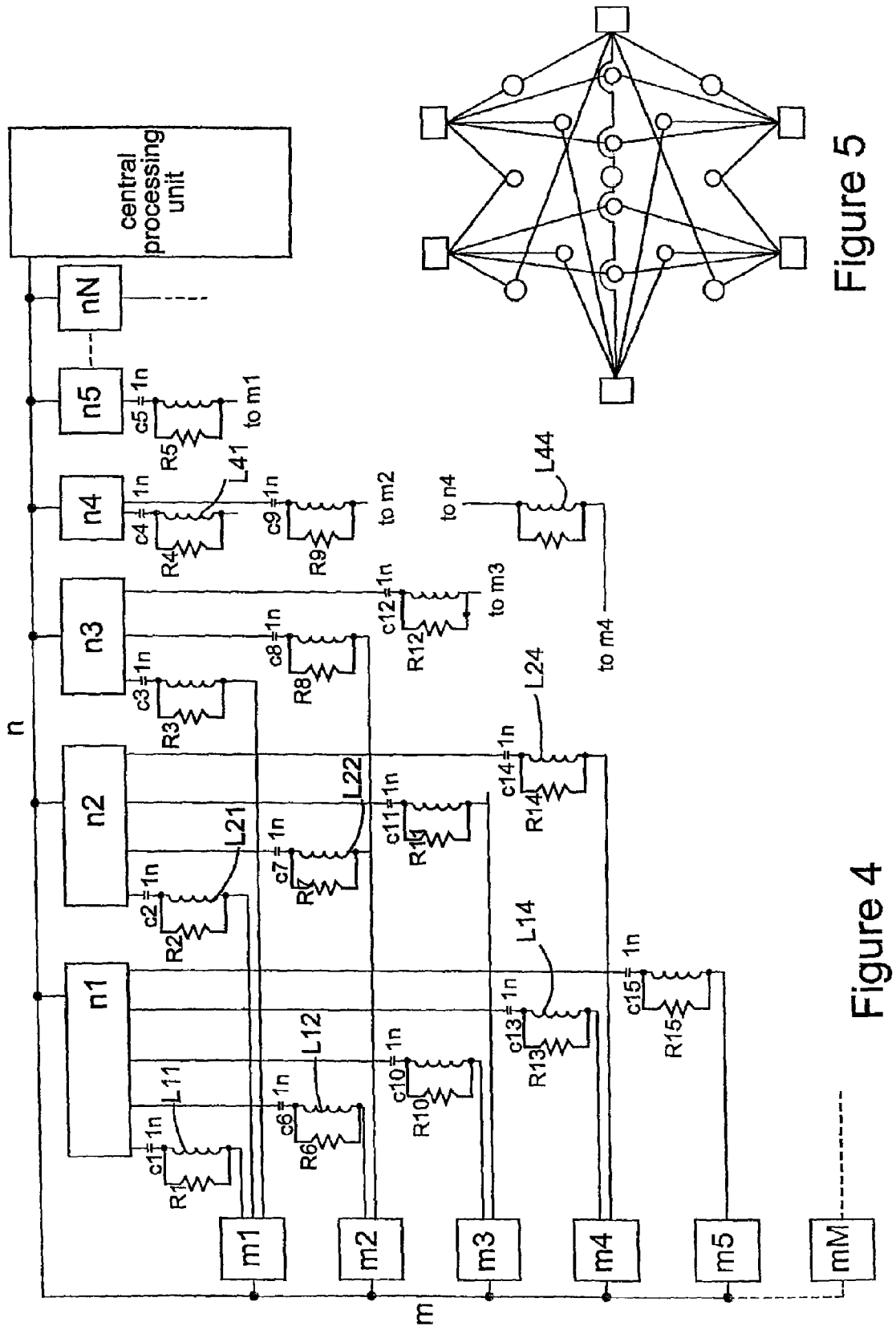

_US 7,368,691 B2_

INDUCTION HEATING APPARATUS

CROSS REFERENCE TO RELATED APPLICATION

This application claims the benefit and priority of U.S. Provisional Patent Applications Ser. No. 60/506,189 filed Sep. 25, 2003 entitled "INDUCTION HEATING APPARATUS OPTIMIZED TO DRIVE MULTIPLE COILS IN A MATRIX CONFIGURATION", the entire disclosure of which is incorporated herein by reference.

BACKGROUND OF THE INVENTION

Present induction cooktop designs (mainly but not only for domestic use) implement a "concentrated hobs" topology: similar to gas cooktops, there are a number of main heating sources, typically four, (with different maximum power levels in general to simulate the different gas outlets) and the cooking utensil, e.g. a pan or pot, is heated only if put in the proper position above one of the heating sources, typically disposed under a glass cooktop plate. Each heating source or hob is realized by a coil which, driven by a series resonant converter running at several tens kHz, couples electromagnetic energy with the cooking utensil (which must have a metallic, e.g., ferromagnetic base), thus heating it by inducing electrical currents in the cooking utensil. By changing the frequency according to a reference power signal, the actual power delivered to the coil (and to the cooking utensil) is changed accordingly.

To work properly, the relative position between the coil and the utensil must be defined. Otherwise, electromagnetic coupling will be weak and the resonant converter will be overstressed without delivering the proper power to the utensil.

According to another concept, called the "distributed" induction heating concept, the utensil is to be heated independently from its position over the cooktop glass plate. This requires the use of a large number of smaller coils, whose number defines the "resolution" of the cooktop versus the size of the utensil, each coil driven by a properly sized adjustable high frequency power source, and an intelligent utensil detection system, which activates only those coils which are covered by the utensil. This poses the issue of how many electrical power sources are needed and how they should be connected to the coils. The number of electrical power sources and their connections to the coils must be made in accordance with the following requirements:

a) The heating sources (hobs) must be activated in any possible subset configuration, except that in each subset the elements (coils) are contiguous to each other; the subset number may vary from 1 to a maximum. In fact, the utensil can be square or round or long or of any other shape.

b) Connections must be achieved with the minimum possible number of "switching" elements (arranged or not arranged in a switching matrix).

c) Each subset, constituted by "M" elements, must be independently controllable in power level.

d) The cost of the power conversion must be minimized.

The simplest way to achieve goals a) to c) is to have one power converter driving each coil; in this case no switching matrix is needed on the power side, and each converter would be optimized to drive the coil and to control it, and the coil power control could be simply realized through a low level reference signal network arranged in a switching matrix (for an N×N coil set, 2×N lines would be sufficient, for example, for ON/OFF control and another 2×N lines for fine power tuning) and controlled by a centralized controller. This solution has possibly never been described but it may be very expensive, so its industrial validity is questionable.

Another possible solution would be to use a single converter sized for the maximum whole cooktop power, while a switching matrix properly connects the various coils to the converter's outputs.

Since such a switching matrix should act directly on the power connections of the coils, very expensive high power relays or high power solid state switches would be needed. Such a solution, described for example, in U.S. Pat. No. 5,714,739 for the case of 4 hobs, has several drawbacks. In particular, such an optimized switching matrix (hence having a "minimum number of switches") would put the coils in parallel to each other as the cooking utensil's size increases. This means the "equivalent" inductance seen by the converter would go down as the number of coils increases, (which also means a higher power level is required from the converter). In turn, this would result in an increase of the switching frequency of the converter as the power level increases, which is not acceptable.

Furthermore, to independently control the power of more subsets each composed by "m1", "m2" . . . "mn" coil elements, low frequency PWM operation through the switching relays would be required, as described in previous patents, having the converter tuned to the overall load at the maximum power. However, this would mean the converter would be connected to a dynamically changing load, i.e., every time a number of relays is commutated to select a new load or simply to PWM an activated load, the equivalent load seen by the converter would change.

The relays in such a design would have a very limited lifetime, due to the enormous number of operations required (for example, switching at a period of 2.5 sec, and considering an average cooktop utilization of 4 hours/day×365 days/year×10 years, the relays would be required to perform 30 million operations).

The number of subsets of independent coils would reduced in such a system. It can be shown that only the elements above (or below) the center diagonal of the rectangular matrix of coils may be independently controlled through the action of the relays, and, in fact, not in all cases. If the elements above the center diagonal are independently controllable, the elements below the center diagonal of the matrix would receive a non controllable amount of power; i.e., with 2×N relays, for a square N×N matrix, a maximum of 2N−1 elements can be independently controlled. In a rectangular matrix, the number of independently controllable coils is N+M−1, where N+M equal the total number of converters (N=number of columns, M=number of rows).

SUMMARY OF THE INVENTION

The above and other problems are solved by the present invention. According to the invention, an induction heating apparatus is provided comprising a plurality of converters, without the need of any relays or solid state relay switches, connected to each other and to series resonant circuits each comprising a coil and a resonant capacitor, such that, by switching on any two of the converters, a single coil, at the cross point between them, is activated.

The invention, according to one aspect, comprises an apparatus for providing electrical power to at least one inductor wherein the at least one inductor is disposed to inductively couple the electrical power to an electrically conductive object to heat the electrically conductive object by inducing electrical current to flow in the electrically conductive object, the apparatus comprising at least one inductor, at least one first half-bridge converter coupled across a DC bus and having an output coupled to a first terminal of the at least one inductor; and at least one second half bridge converter coupled across the DC bus and having an output coupled to a second terminal of the at least one inductor, each half bridge converter comprising first and second alternately conductive series connected switches connected between the DC bus, the at least one inductor being energized by alternately turning on respective ones of the first and second switches of each converter to cause current to flow from the DC bus alternatingly through the at least one inductor from the first and second converters.

Other features and advantages of the present invention will become apparent from the following description of the invention which refers to the accompanying drawings.

BRIEF DESCRIPTION OF THE DRAWING(S)

FIG. 4 shows one arrangement of the induction heating apparatus according to the invention; and FIG. 5 is a block diagram showing another arrangement of the induction heating apparatus according to the invention.

DETAILED DESCRIPTION OF THE INVENTION

Figure 1:
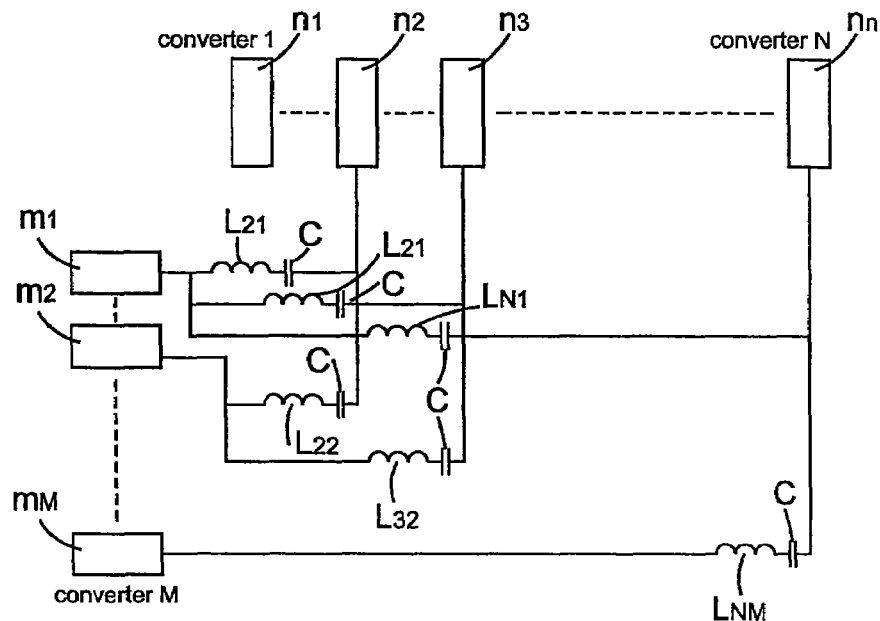
FIG. 1 is a block diagram of a portion of an induction heating apparatus according to the invention.

With reference to the drawings, FIG. 1 shows a block diagram of the invention (only limited to 6 coil-capacitor networks for sake of clarity).

The arrangement includes a plurality of connectors n1 to nN and m1 to mM and mm. Each converter (n1 to nN and m1 to mM) is of the half-bridge type, and is operated at a fixed frequency near the resonant frequency of the network constituted by a single coil L12, L13 . . . LMN (with its equivalent cooking utensil resistance in parallel not shown) and the resonant capacitor C in series. Although the converters are shown arranged in rows (m) and columns (n), this need not be the case. Any arrangement can be employed, and in fact, the coils are preferably arranged and connected to the converters in such a way as described later to provide the maximum permissible independent control of the coils via the N+M converters.

Each resonant network is connected between two converters, in such a way that a full bridge configuration is provided with the resonant network coupled into the full bridge between the half bridges.

Each pair of converters is then operated at constant frequency, but in phase shift between each other, so that the power delivered to a coil may be changed according to a reference power control signal.

A low level signal network, issuing an ON/OFF command and a power reference level, will be provided by a central controller unit (not shown in FIG. 1) to each of the converters.

Such a network will comprise a number of (double) lines which is equal to the number of converters N+M (such network is not shown in FIG. 1).

When operating more than one converter at the same time, even if they are contiguous to each other, each converter will "see" its own series resonant circuit, and will not interfere with any other converter. There are no coils being placed in parallel to each other thereby not changing the resonant circuit seen by any converter, as in the prior art solutions.

Figure 2:
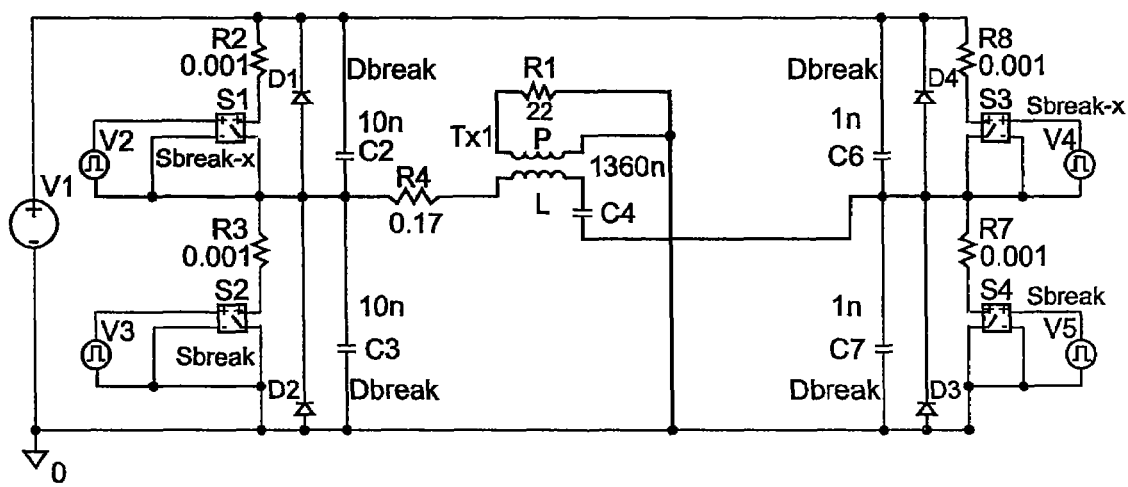
FIG. 2 is a schematic diagram of two of the plurality of converters of FIG. 1 showing their connections to an induction heating coil element.
Figure 3:
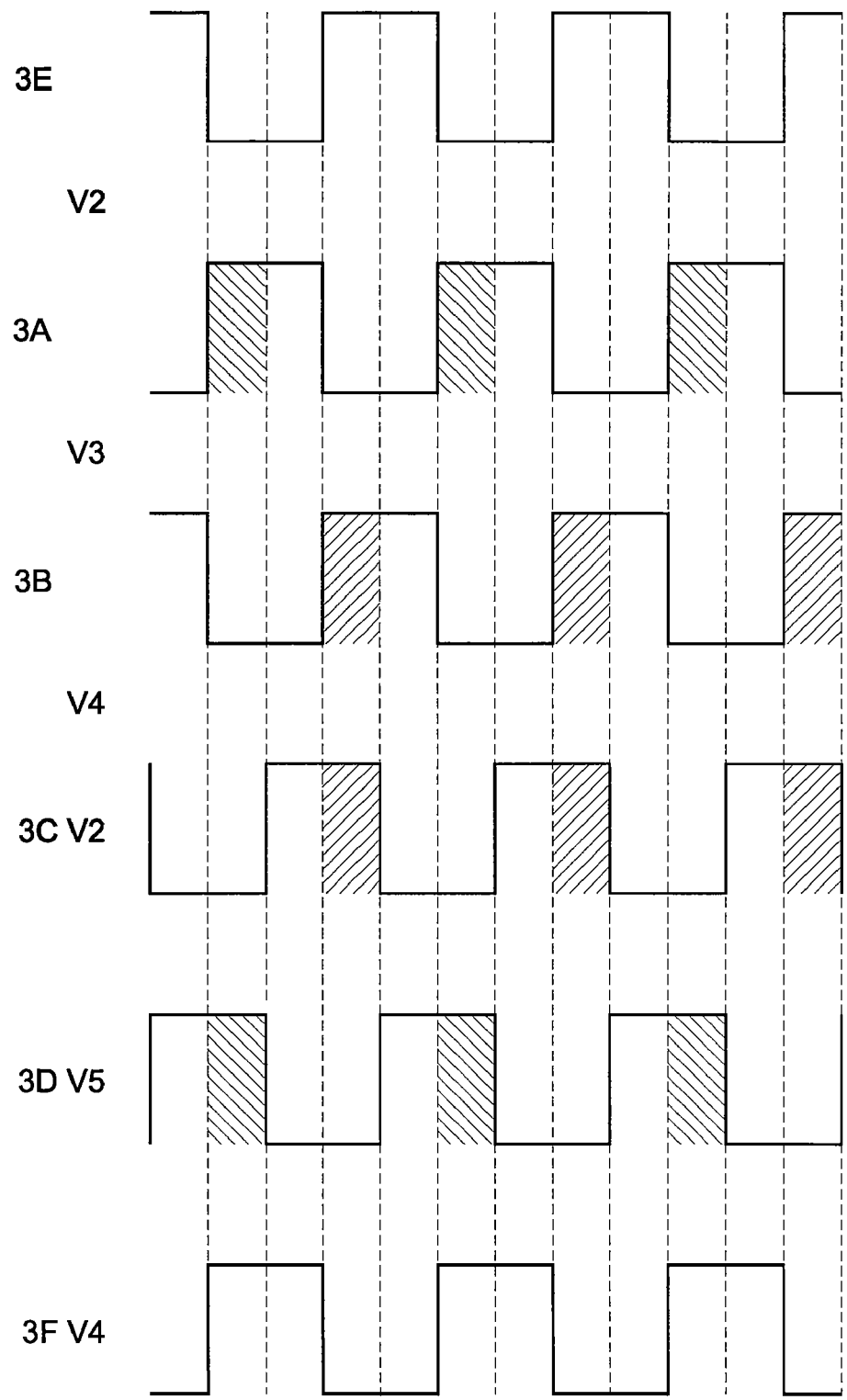
FIG. 3 is a timing diagram illustrating phase control showing how power to an induction heating element may be controlled.

To better explain what a single coil "sees" when activated, and how the phase shift between the two converters, e.g., (one in a column and the other in a row) is able to change the power level of the coil at the cross point between two converters, FIG. 2 show the equivalent schematic diagram of two converters operating to control the power in a single coil L, while FIG. 3 show the high frequency PWM strategy implemented in the two converters, showing the phase shift between the two.

In FIG. 2, S1 and S2, together with D1 and D2, C2 and C3, and V2 and V3, represent any one of the converters of the switching matrix, while S3 and S4, together with D3 and D4, C6 and C7, and V4 and V5, represent any other converter of the switching matrix.

R2, R3, R7 and R8 are dummy resistances which represent the equivalent series resistance of the switches S1, S2, S3, S4, while V1 is a DC voltage which represents the rectified AC line (not necessarily filtered).

TX1, R1 and C4, together with R4, represents the model of the resonant circuit comprising the series resonant capacitor C4 in series with the coil, shown as a transformer TX1 representing the primary coil L and the secondary coil P and its resistance R1 (comprising the equivalent circuit of the cooking utensil being heated.)

Since S1 and S2 are operated at constant frequency, with 50% duty cycle, V2 and V3 are simply 180° phase shifted between each other, as are V4 and V5. The coil's power control variable is the phase shift between V2 and V5, for example, and between V3 and V4 (which is the same).

FIG. 3 shows one example of the phase arrangement of voltages V2(3A), V3(3B), V4(3C) and V5(3D), each at 25 kHz where V4 is 90° out of phase with V3 and V5 is 90° out of place with V2. This results in half the full power being provided to the coil, as shown by the corresponding hatched lines.

For 0° phase shift between V2 and V5, and V3 and V4, the power delivered to the coil will be maximum. For 180° phase shift between V2 and V5, and V3 and V4, the power will be zero. This is shown in FIG. 3E, where V5 is shown with a 180° phase shift from V2 and in FIG. 3F, where V4 is shown with a 180° phase shift from V3. In both cases, the pulses do not overlap so no power is delivered to the coil. For intermediate values of the phase shift, intermediate values of the coil's maximum power will be obtained.

The operation of each series resonant converter is such that the operating frequency must be above the resonant frequency of the series resonant network, otherwise excessive overstress will be applied to the switches.

The zero power condition may be achieved by switching off one like switch (high side or low side) of each converter, by 180° phase shift as described above or by switching off both devices of one of the pair of converters (three-state condition).

In case of multiple coils being activated at the same time, it is sufficient to activate the converter pairs connected to those coils.

Each converter or the converter pair will be driven with a different phase delay with respect to the other converters of the pair depending on the power level selected for the particular coil.

From FIG. 1, it could appear the converters are connected to the coil in a standard matrix configuration. Such a configuration can present some of the drawbacks already described for the prior art solutions unless the coils are arranged so as to optimize their independent control.

An example, with reference to FIG. 4, will better explain this.

Suppose the converters are connected in a standard matrix configuration (M rows and N columns) and n1, n2 . . . nN define the converters in the columns and m1, m2 . . . mM defines the converters in the rows.

N and M can be any number above 1. FIG. 4 shows converters n1 to nN in columns and converters m1 to M in rows. However, only coils above the center diagonal are shown.

Also suppose the following pairs of converters are activated: n2 and m1 energizing coil L21, n4 and m1 energizing coil L41, n2 and m4 energizing coil L24, n4 and m4 energizing coil L44.

Suppose further that each coil requires a different power level: P1, P2, P3 and P4, that is, coil L21 receives power P1, and L41 receives power P2, and L24 receives power P3 and coil L44 receives power P4, where each coil L is in the form Lnm.

Now, to deliver power P1 to L21, shown in FIG. 4, converters n2 and m1 will be activated with a proper phase shift Phn2−m1 between each other.

For sake of clarity, a "virtual" zero phase is defined. Converter n2 will have phase Phn2 and converter m1 will have phase Phm1. The coil network will see the difference Phn2−Phm1=Phn2−m1.

Then, to deliver power P3 to the coil network at the cross point between n2 and m4, converter n2 is already activated, so it will be only necessary to activate converter m4, with a phase Phm4 such that Phn2−Phm4 will provide the needed power P3.

Again, to deliver power P2 to the coil network at the cross point between n4 and m1, m1 already being ON, it will be sufficient to activate converter n4, with a phase Phn4 such that Phn4−Phm1 provides the power P2.

If we now try to control also coil L44 to provide power P4 to it independently, we discover that this is not possible. In fact, converters n4 and m4 are already activated and their phase shift is fixed by the power they need to deliver to the other coil networks L24 and L41.

So, similar to the case of a relay switching matrix, a first limit to this topology is that only the upper (or lower) semi-diagonal matrix of coils has elements whose power may be independently selected, and not in all cases. This is shown in FIG. 4. In this figure, only the coils above the semi-diagonal are shown (with the exception of coil L44, which is shown, and it can be observed that only the coils above the semi-diagonal can be independently controlled, but not in all cases. Coil L44, below the semi-diagonal cannot be independently controlled. If coils L11, L21 and L14 are activated, coil L24 also can not be independently activated, for example, even though it also is above the semi-diagonal.

To show this further limitation, suppose only the upper semi-diagonal is actually wired and N=M=5. Also suppose 4 adjacent coils must be activated to heat a large pot or pan, and those coils are on the upper left corner of the cook-top, that is to say, activated by column converters n1 and n2 and row converters m1 and m2. This would comprise coils L11, L12, L21 and L22 of FIG. 4.

At this point, we also want to heat a smaller pan, which may be heated by a single coil-driven by converter n1 and m4.

Since n1 and n2 are active converters, not only the coil at the cross point between n1 and m4 will be activated, but also the adjacent coil (the one at the cross point between n2 and m4). Since N=M=5, L14 as well as coil L24 are above the semi-diagonal. See FIG. 4.

The theoretical number of coil networks which can be truly independently controlled in a rectangular matrix of N by M converters is only N+M−1.

To reduce the impact of these limitations, another concept has to be used: the concept of "adjacent coils". The basic idea is that adjacent coils cannot have the need to be driven at different power levels.

While this seems a limitation (and it is from a purely theoretical point of view) it is not from a practical point of view, because:

a) in the case of large cooking utensils, covering more than one coil, adjacent coils share, of course, the same power level because they are heating the same utensil.

b) in the case of small utensils, only covering one coil, adjacent coils should simply not be activated at all.

At this point a modified switching matrix can be introduced, which takes advantage of the "adjacent coils" concept.

Such a matrix is schematically shown in FIG. 5 in a tree and branch structure.

The blocks in FIG. 5 represents the converters, the circles represent the coils.

An example of 6 converters is shown. It can be shown that the maximum number of coils which may be driven by 6 converters is 15. Each block (converter) may drive up to 5 coils (circles).

The formula (if the principle of "adjacent coils" is applied) is:

$$N\text{coils}=N\text{converter}*(N\text{converter}-1)/2, \text{ where } N\text{converter is the total number of converters}$$

Out of the 15 coils shown in FIG. 5, only 5 are actually truly independent from each other according to the formula 2N−1 for a square matrix or N+M−1 for a rectangular matrix, where N and M represent the number of columns and rows respectively. By proper wiring of the connections, however, the non-independent coils can be placed "adjacent" each other and adjacent to an independent coil in a way such that a small cooking utensil which needs a single coil can be independently controlled, while a bigger pan which covers several adjacent coils will require adjacent coils that are not independent to be activated but with the same power level.

If the "adjacent coils" principle is not applied, the general formula for the number of coils that can be driven truly independently is 2N−1 for a square matrix or N+M−1 for a general rectangular matrix, as discussed above.

Another benefit of the switching matrix of FIG. 5 is that every converter is attached to an equal number of coils, so its power loading (which affects its size and cost) is the same.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Apparatus for providing electrical power to at least one inductor wherein the at least one inductor is disposed to inductively couple the electrical power to an electrically conductive object to heat the electrically conductive object by inducing electrical current to flow in the electrically conductive object, the apparatus comprising:
   at least one inductor;
   at least one first half-bridge converter coupled across a DC bus and having an output coupled to a first terminal of the at least one inductor; and
   at least one second half bridge converter coupled across the DC bus and having an output coupled to a second terminal of the at least one inductor;
   each half bridge converter comprising first and second alternately conductive series connected switches connected between the DC bus;
   the at least one inductor being energized by alternately turning on respective ones of the first and second switches of each converter to cause current to flow from the DC bus alternatingly through the at least one inductor from the first and second converters.

2. The apparatus of claim 1, wherein the at least one first and second converters are configured to provide variable power to the at least one inductor by varying a phase shift between the on-times of respective switches of the converters.

3. The apparatus of claim 1, wherein the at least one first converter comprises a plurality of first converters, the at least one second converter comprises a plurality of second converters, and the at least one inductor comprises a plurality of inductors, each of the first converters having an output connected to respective first terminals of respective ones of the plurality of inductors and each of the second converters having an output connected to respective second terminals of ones of the plurality of inductors, whereby a respective inductor is provided with electrical power by turning on a selected switch in respective ones of the first and second converters.

4. The apparatus of claim 3, wherein a phase shift of the selected switches in the respective first and second converters determines the electrical power provided to the respective inductor.

5. The apparatus of claim 3, wherein the plurality of first converters and the plurality of second converters can be arranged in a structural arrangement with the respective inductors coupled at intersections of the outputs of the converters arranged in the structural arrangement.

6. The apparatus of claim 5, wherein the structural arrangement comprises a matrix.

7. The apparatus of claim 6, wherein the matrix comprises a row and column arrangement.

8. The apparatus of claim 5, wherein the structural arrangement comprise a matrix wherein the converters are coupled to the inductors arranged above or below a center diagonal of the matrix.

9. The apparatus of claim 5, wherein the structural arrangement comprises an interconnected tree and branch structure.

10. The apparatus of claim 3, wherein the inductors can be arranged in a cooktop of an electric range to heat one or more conductive objects such as cooking utensils.

11. The apparatus of claim 10, wherein the inductors can be arranged in a grid.

12. The apparatus of claim 4, wherein the number of inductors ($N_{coil}$) is determined by the equation $N_{coil}=N*(N-1)/2$ where $N$ is the total number of converters.

13. The apparatus of claim 7, wherein the number of inductors ($N_{coil}$) is determined by the equation $N_{coil}=N*(N-1)/2$ where $N$ is the total number of converters.

14. The apparatus of claim 1, wherein selected switches of the first and second converters are turned on with a pulse width modulation (PWM) command.

15. The apparatus of claim 3, further comprising a controller for turning on selected switches of the plurality of first and second converters at specified times to provide power to specified ones of the inductors in accordance with a desired selection of ones of the inductors to cause electrical current to flow in the conductive object to be heated.

16. The apparatus of claim 3, wherein the inductors are arranged such that at least some of adjacent ones of the inductors, when energized, are provided with the same electrical power.

17. The apparatus of claim 1, where the at least one inductor is coupled in series with a resonant capacitor between the at least one first and second converter.

* * * * *